United States Patent [19]

Hassel, Sr.

[11] Patent Number: 4,540,216
[45] Date of Patent: Sep. 10, 1985

[54] CONVERTIBLE SEAT FOR VEHICLES

[76] Inventor: Karl D. Hassel, Sr., 369 Central Ave., Plain City, Ohio 43064

[21] Appl. No.: 515,804

[22] Filed: Jul. 21, 1983

[51] Int. Cl.³ .............................................. A47C 15/00
[52] U.S. Cl. ..................................... 297/238; 297/112; 297/256
[58] Field of Search ................ 297/238, 113, 112, 115, 297/191, 256, 483, 14

[56] References Cited

U.S. PATENT DOCUMENTS

| | | | |
|---|---|---|---|
| 1,253,241 | 1/1918 | Haussinger | 297/238 X |
| 2,294,039 | 8/1942 | Looney | 297/191 |
| 2,966,201 | 12/1960 | Strahler | 297/238 |
| 3,094,354 | 6/1963 | Bernier | 297/112 |
| 3,338,631 | 8/1967 | Smith et al. | 297/256 |
| 3,583,761 | 6/1971 | Hume | 297/483 |
| 3,669,492 | 6/1972 | Peterson | 297/256 |

Primary Examiner—Francis K. Zugel
Attorney, Agent, or Firm—Kremblas, Foster, Millard & Watkins

[57] ABSTRACT

A convertible seat for use by children in automobiles and other vehicles which is foldable and covered within the usual adult sized seating of the vehicle providing the usual appearance, and which is unfoldable and uncoverable to provide a simply constructed children's safety seat, upon and within the adult seating. The children's seat, when unfolded, has all of the presently considered necessary and advisable features to provide safety to a child seated therein.

9 Claims, 4 Drawing Figures

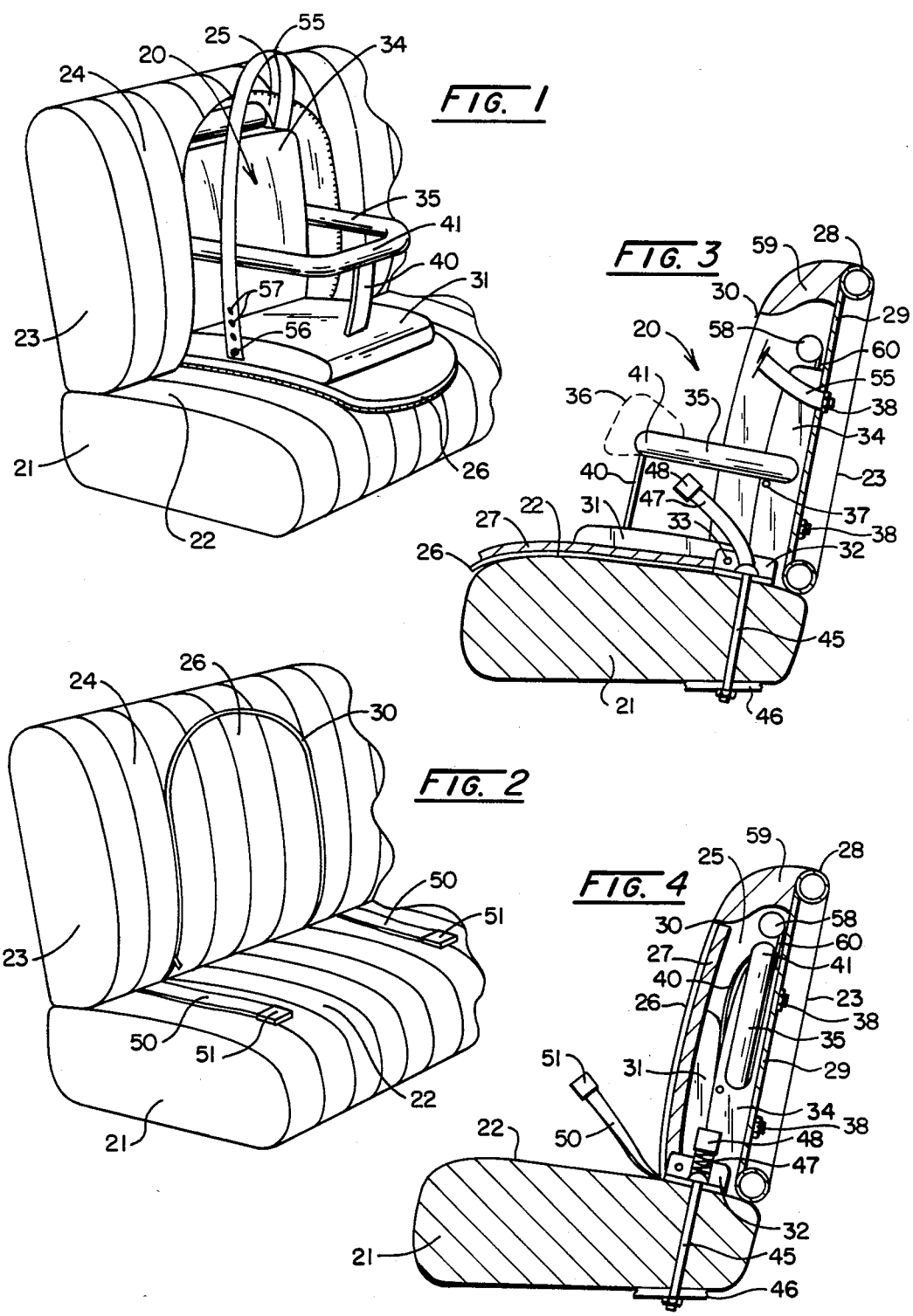

CONVERTIBLE SEAT FOR VEHICLES

FIELD OF THE INVENTION

This invention relates to a seat in automobiles and other similar vehicles; and more particularly it relates to such a seat that is especially constructed and intended for the safety of a child in the vehicle, while also being readily storable and convertible to a seat for an adult.

BACKGROUND OF THE INVENTION

Seats are currently being furnished in the marketplace, which are specifically intended for use by children in automobiles. These seats are of various kinds and many are constructed in accordance with recently enacted governmental regulations and laws, providing that children must be specially seated and restrained in automobiles when the automobiles are in motion. Such laws and regulations have been enacted in response to the recently acquired research showing that injuries received by children are quite often the result of the unrestrained motion imparted to the child when the vehicle is in an accident. It is now known that the child is frequently thrown about in the car impacting on the various doors, windows, knobs, steering wheel, and other protuberances.

The laws and regulations for children's vehicle seats prescribe several salient features thought to be most necessary. These include a secure anchor to the frame of the car, a secure guard encircling the child's upper body, and a guard to receive the impact of the child's face in the event of rapid deceleration. These special guarding features have had the disadvantage, however, that they have tended to cause production of a cumbersome seat which is awkward to handle between uses, either occupying space on the seats of the car or requiring that they be taken in and out and stored in the trunk or some other place.

The possibility of storing a child's seat within the normal built in seats of the automobile has not been overlooked in the past, and various self storing and/or convertible seats have been proposed although none have apparently met the needs of the using public. This may be because of their complicated and cumbersome nature which has made them relatively expensive.

Examples of prior art convertible child's seats for automobiles include U.S. Pat. No. 2,966,201—Strahler, showing a fold out cradle and seat combination. U.S. Pat. No. 2,436,294—Glatstein, reveals another approach to the problem.

Other patents of interest include U.S. Pat. Nos. 2,584,481—Mast et al., 2,337,480—Logan, 3,951,450—Gambotti, and French Pat. No. 2,307,673. The above recited patents have not apparently met the needs and acceptance of the public since most seats currently in use are of the type that are removable, and are hung on the back of the seat or rest on the bench of the vehicle seat.

SUMMARY OF THE INVENTION

In summary, this invention is a convertible seat for a vehicle comprising: (a) an adult size seat including a substantially horizontal cushion for support when a person is seated, juxtaposed and meeting a substantially vertical backrest with a back support surface, the backrest having an aperture as an entrance to a cavity therein, with the aperture having a closure fastenable at the surface of the backrest; (b) a foldable child's size seat attached to a frame within the cavity including a second cushion attached to the frame and pivotable thereon from a position substantially vertical when folded to a position substantially horizontal when unfolded, the cushion being juxtaposed and meeting a substantially vertical second backrest with a back support surface, the cushion being foldable to a position adjacent to the second rest when in folded position, and an armrest guard encircling the second cushion position when unfolded substantially parallel therewith, attached to and pivotal with the second backrest surface when unfolded, and substantially vertical when folded, the second cushion, armrest and guard being pivotal to the folded position, enclosable in the cavity, and covered by the closure means.

Among the objects of the invention are the provision of a readily foldable unit meeting all the requirements presently considered necessary for safety and unobtrusively and completely disposable within the adult seat structure of the vehicle so that the vehicle has the appearance and riding capabilities of a normal seat structure.

It is a further object to provide a convertible seat structure which is a simplified arrangement of parts in comparison with the prior art so that the cost and operational difficulties are reduced.

The foregoing and other advantages of the invention will become apparent from the following disclosure in which a preferred embodiment of the invention is described in detail and illustrated in the accompanying drawing. It is contemplated that variations in structural features and arrangement of parts may appear to the person skilled in the art, without departing from the scope or sacrificing any of the advantages of the invention.

DESCRIPTION OF THE DRAWINGS

FIG. 1 is a perspective view of the convertible seat of this invention in the open unfolded position ready for use by a child.

FIG. 2 is a perspective view of the invention in the closed position ready for use by an adult.

FIG. 3 is an elevational cross-sectional view of a seat structure in an automobile including the convertible seat of this invention in the open position corresponding to the perspective view of FIG. 1.

FIG. 4 is a elevational cross-sectional view of an automobile seat having a convertible child's seat of this invention in the closed position, corresponding to the perspective view of FIG. 2.

DETAILED DESCRIPTION OF THE INVENTION

Referring to FIG. 1, a convertible seat 20 is shown in open unfolded position upon and within an adult size seat 21 including a substantially horizontal cushion 22 for support when a person is seated. The cushion 22 is juxtaposed to and meets a substantially vertical backrest 23 with a back support surface 24. The backrest 23 is provided with an aperture 25 having a closure 26. The backrest 23 is constructed primarily of padding 59 covered by the usual velour, polymer, or leather upholstery covering 60.

As more clearly seen in FIG. 2, the closure 26 is fastenable with the surface 24 at the edge of the aperture 25 by a closure means such as a zipper 30 when the seat 20 is in the closed folded position.

Referring again to FIG. 1, and also to FIG. 3, the convertible child'seat 20 includes a second cushion 31 attached to a frame 32. The cushion 31 is juxtaposed and pivotally connected to the frame 32 by a pivot means 33, such as a pin. The frame 32 provides a means of connection to a second backrest 34.

The backrest 23 includes a horizontal headpiece 28 connected by vertical spring members 29. The second backrest is connected by means such as bolts 38 to the spring members 29. In the conventional manner, not shown, the backrest structural members 28 as fastened to the frame of the automobile. By means of the connections just described including the bolts 38, springs 29, structural members 28, the second backrest 34 and the seat 20 are safely fastened to the frame of the vehicle.

An armrest 35 is constructed to fit roundabout a seated position for a child upon the second cushion 31 in the unfolded position. The armrest 35 as it passes around the upper torso of the child serves as a guard for the descending face of the child if it should be thrown forward.

As seen in FIG. 3 an enlarged guard 36 (shown in phantom), may be placed over the armrest to bring the armrest 35 in closer proximity to the face of a child occupying the seat in the unfolded position.

In the unfolded position the armrest 35, which pivots on the side of the second backrest 34, is held in a horizontal position by a retainer means 37.

A web or strap means 40 connects an outer portion 41 of the armrest 35 and the second cushion 31. The strap is intended to pass between the legs of the child as a means of further restraining the child in the seat 20.

Between the cushion 31 and the cover 26, a padding 27 is provided to add more strength and cushioning resilience to the cover 26 as it moves from the unfolded position shown in FIG. 3 to the folded position shown in FIG. 4.

As seen in FIG. 4, the cushion 31 is pivoted to a vertical position and the armrest 35 is likewise pivoted to a comparable vertical position in the enclosure 25. The cover 26 and the padding 27 are folded to a position filling the edges of the aperture and the closure means 30 seals the cover 26 in place. All of the critical features of an acceptable child's safety seat, are available in the unfolded position but are securely stowed away in the folded position. Simplicity of the arrangement is a feature, since the objectives are accomplished with a minimum number of parts that operate in simple fashion.

Of critical importance in the construction of safety seating in automobiles is the provision and use of seat belts. All rules and regulations for automobile seating safety require that seat belts be provided which are attached to a main frame of the automobile itself. In the apparatus of this invention the frame 32 is fastened to the frame of the automobile by suitable means such as a main frame bolt 45 which is connected to a main frame member 46 of the automobile. A seat belt 47 with a buckle 48 is fastened beneath the bolt 45.

Alternatively a seat belt 50 having a buckle 51 may be used either by an adult occupant of the vehicle when the child's seat 20 is in the folded position as shown in FIG. 4, or the same seat belt 50 may be used in conjunction with a seated child when the adult seat 40 is in the unfolded position as shown in FIGS. 1 and 3.

Referring again to FIG. 1, in some circumstances it will be desirable or required that shoulder straps be provided as part of the child restraint system. Such shoulder straps 55 may be fastened behind the second backrest 34 on the bolts 38 and pass around the seating position of the child to anchor on a pin 56 on the side of the second cushion 31. Alternative holes may be provided 57 to adjust the shoulder strap 55 to children of different sizes.

A headrest 58 may be provided at the top of the second backrest 34, fastened to a strap 60 which is constructed to slide within the back of the backrest 34 and to be adjustable for the appropriate height of a child in the seat 20. In the folded position the headrest 58 may be extended up into a recess in the padding 59 comprising the ordinary structure of the adult seat backrest 23.

It will be apparent that the construction of this invention provides for all the required safety features presently thought to be necessary in safe child seating. This is provided in a minimum space with a maximum of simplicity. In addition, the closure of the aperture in the folded position is complete, giving the automobile seat almost normal appearance and comfort. All storage problems are alleviated.

It is herein understood that although the present invention has been specifically disclosed with the preferred embodiments and examples, modification and variations of the concepts herein disclosed may be resorted to by those skilled in the art. Such modifications and variations are considered to be within the scope of the invention and the appended claims.

What is claimed is:

1. A convertible seat for a vehicle comprising:
a. an adult size seat constructed on a main frame that is attached to the vehicle including a substantially horizontal cushion for support when a person is seated, juxtaposed and meeting a substantially vertical backrest with a back support surface, the back support surface having an aperature as an entrance to a cavity therein, with the aperature having a closure means fastenable at the surface of the backrest; and
b. a foldable child's size seat attached to the main frame within the cavity including a second cushion attached to the main frame and pivotable thereon from a position substantially vertical within the cavity when folded to a position substantially horizontal when unfolded within and outside the cavity, the cushion being juxtaposed and meeting a substantially vertical second backrest with a back support surface attached to the main frame, the cushion being foldable to a position adjacent to the second back rest when in folded position, and an armrest guard encircling the second cushion position when unfolded substantially paralled therewith, attached to and pivotal from the second backrest surface when unfolded, and substantially vertical when folded, the second cushion and armrest guard being pivotal, enclosed in the cavity, and covered by the closure means, in the folded position.

2. A seat according to claim 1 wherein the closure means includes padding on the enclosed surface to provide a resilient back support rest when the child size seat is folded within the cavity.

3. A convertible seat according to claim 1 wherein the closure means is fastened with a zipper at the surface of the backrest.

4. A convertible seat according to claim 1 wherein a safety belt is provided for an occupant of the adult seat, the safety belt being extendable to encompass a child occupant of the child seat when unfolded.

5. A convertible seat according to claim 1 wherein the armrest and guard is foldable to a position encircling the top of the second backrest in the folded position.

6. A convertible seat according to claim 1 wherein the armrest and guard is provided with an upwardly and outwardly extending cushioned face guard to receive and cushion the head of a child occupant when necessary.

7. A convertible seat according to claim 1 wherein the frame is provided with connectable seatbelts constructed to encircle the lap of a child when in seated position on the child's seat, foldable within the enclosure when the child's seat is folded.

8. A convertible seat according to claim 1 wherein the frame is provided with connectable shoulderbelts constructed to encircle the lap of a child when in seated position on the child's seat foldable within the enclosure when the child's seat is folded.

9. A convertible seat according to claim 1 wherein the second backrest is provided with an adjustable retractable headrest constructed to fit within the enclosure and to be positioned behind the head of a child in seated position on the child's seat.

* * * * *